(12) United States Patent
Hillenburg et al.

(10) Patent No.: US 10,188,997 B2
(45) Date of Patent: Jan. 29, 2019

(54) SCALLOP SUPPORT DISTRIBUTOR FOR RADIAL FLOW REACTOR

(71) Applicant: Woven Metal Products, Inc., Alvin, TX (US)

(72) Inventors: Russell Hillenburg, Alvin, TX (US); Gene Eberhardt, Alvin, TX (US); Heather Bennett, Alvin, TX (US)

(73) Assignee: Woven Metal Products, Inc., Alvin, TX (US)

( * ) Notice: Subject to any disclaimer, the term of this patent is extended or adjusted under 35 U.S.C. 154(b) by 0 days.

(21) Appl. No.: 15/624,392

(22) Filed: Jun. 15, 2017

(65) Prior Publication Data

US 2017/0361293 A1    Dec. 21, 2017

Related U.S. Application Data

(60) Provisional application No. 62/350,611, filed on Jun. 15, 2016.

(51) Int. Cl.
*B01J 8/02*    (2006.01)

(52) U.S. Cl.
CPC ...... *B01J 8/0278* (2013.01); *B01J 2208/0092* (2013.01); *B01J 2208/00938* (2013.01)

(58) Field of Classification Search
CPC ...... B01J 8/0278; B01J 8/0214; B01J 8/0407; B01J 2208/00938; B01J 2208/00929; B01J 2208/0092

See application file for complete search history.

(56) References Cited

U.S. PATENT DOCUMENTS

| | | | |
|---|---|---|---|
| 4,923,108 A | 5/1990 | Cordell | |
| 5,118,419 A | 6/1992 | Evans et al. | |
| 5,366,704 A | 11/1994 | Koves et al. | |
| 7,226,568 B1 | 6/2007 | Ham et al. | |
| 7,842,257 B2 * | 11/2010 | Fecteau | B01J 8/0035 422/211 |

FOREIGN PATENT DOCUMENTS

| | | |
|---|---|---|
| DE | 3111892 A1 | 10/1982 |
| GB | 484455 A | 5/1938 |

OTHER PUBLICATIONS

Notification of Transmittal of the International Search Report and Written Opinon filed in counterpart application PCT/US2017/037734, dated Aug. 21, 2017.

* cited by examiner

*Primary Examiner* — Lessanework Seifu
(74) *Attorney, Agent, or Firm* — Blank Rome LLP

(57) ABSTRACT

The invention provides a support distributor for a scallop for use in a radial flow reactor. The support distributor includes an elongated sheet having a plurality of perforations extending through a thickness thereof, and at least three edges along a length thereof so as to form a member having at least three support points which engage an inner surface of the scallop.

20 Claims, 3 Drawing Sheets

SCALLOP SUPPORT DISTRIBUTOR FOR RADIAL FLOW REACTOR

FIELD OF THE INVENTION

The invention relates to an internal support distributor for use with a scallop in a radial flow reactor and methods of using the same.

BACKGROUND OF THE INVENTION

In refining chemical and petrochemical applications, conventional scallops are used in radial flow reactors and function as conduits through which gas, vapor or liquids (hereinafter, referred to as "G-V-L") flow inside the reactor vessel. Scallops are typically formed as elongated, tube-shaped conduits of various geometry, typically having a cross-sectional "D" shape (although other shapes are also used), through which G-V-L flow radially in an inward or outward direction relative to the vessel. The scallops are typically formed of various metal constructions, sometimes having openings on a surface thereof to allow the G-V-L to flow freely through the surface of the scallop, as well as along the length of the scallop. When the G-V-L flow through the scallop and escape through the openings on the surface, they come into contact with catalyst particles contained within an adjacent catalyst bed, thus causing a reaction to take place. In use, the scallops are placed adjacent to one another along the inner circumference of the wall of the reaction vessel.

One common problem with such scallop designs is that they are prone to crushing when in use. Specifically, G-V-L are passed through the scallops at elevated temperatures, pressures and flow rates in order to effect the reaction. The elevated temperature, pressures and flow rate of the G-V-L cause the catalyst bed to heat quickly and expand, thereby increasing the risk of crushing of the adjacent scallops. Some additional causes of scallop crushing include, for example, catalyst plugging, catalyst flow interruptions, material fatigue, corrosion, and other factors. When the scallops are crushed, the G-V-L flow is restricted in the crushed area, thus reducing or preventing the G-V-L from making contact with the catalyst. When this happens, the reaction cannot take place, or is detrimentally reduced, in the crushed zone and the reaction efficiency of the vessel is thus reduced.

Methods of minimizing this crushing effect have been developed in the art, including the use of scallop support structures. However, even such support structures have a tendency of being crushed under the operating conditions of the reaction vessel. Moreover, such structures only support the scallop in the area where they make direct contact with the surface of the scallop. As such, collapse of the scallop in the unsupported areas is still a problem.

Accordingly, an improved scallop support structure is needed that reduces the crushing effect of the scallop and supports the entire scallop structure throughout its lifetime of use in a reactor vessel.

SUMMARY OF THE INVENTION

To solve this problem, the invention is directed to a scallop support distributor for use in a radial flow reactor. The support distributor minimizes scallop crushing and maximizes the life of the scallop, thus improving the integrity of the reaction, improving the bed efficiency and reducing processing times and costs associated with repair and replacement of crushed scallops.

The invention provides a support distributor for a scallop for use in a radial flow reactor which includes an elongated sheet. The elongated sheet has a plurality of perforations extending through a thickness thereof, and at least three edges along a length thereof so as to form a member having at least three support points which engage an inner surface of the scallop.

The invention is further directed to a supported scallop for use in a radial flow reactor which includes an elongated conduit having an inner surface and an outer surface forming an interior, and a plurality of openings extending from the inner surface to the outer surface, and a support distributor positioned within the interior of the elongated conduit. The support distributor includes a plurality of perforations extending through a thickness thereof, and at least three edges along a length thereof so as to form a member having at least three support points which engage the inner surface of the scallop.

The invention also provides a support distributor for a scallop for use in a radial flow reactor comprising an elongated sheet. The elongated sheet has a plurality of perforations extending through a thickness thereof, and at least two edges along a length thereof so as to form a member having at least two support points which engage an inner surface of the scallop. The support distributor has a generally circular or ovular cross-sectional shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The support distributor of the invention is a device that provides physical support to scallops used in radial flow reactor vessels in refining, chemical and petrochemical applications. In operation, within the reactor vessel itself, a plurality of scallops are positioned around the inner circumference of the vessel wall. These scallops function as elongated conduits through which gases, vapors, or liquids (hereinafter, referred to as "G-V-L") which are needed to effect the chemical reaction, flow. Scallops are constructed of various geometries typically having a "D"-shaped cross-section, which is where the name "scallops" originates. However, scallops may also have different cross sectional shapes, such as triangular or trapezoidal. They are typically formed of various metal construction which is manufactured into their desired shape. Suitable scallop designs are presented in U.S. Pat. Nos. 5,209,908, 5,366,704 and 6,224,838, and are incorporated herein by reference.

In one embodiment, a scallop is manufactured from a sheet of metal having openings along a surface thereof. The sheet is preferably formed into a D-shaped scallop. The openings in the surface allow the G-V-L flowing along the length of the scallop to escape through the surface of the scallop, thus coming into contact with the catalyst bed contained in the reaction vessel. Specifically, when the G-V-L escapes through the perforations on the surface of the scallop, they come into contact with catalyst particles contained within an adjacent catalyst bed, thus causing a reaction to take place. In use, conventional scallops have a tendency to be crushed because of the elevated temperature, pressure and flow rate of the G-V-L, thereby reducing the effectiveness of the scallop in the crushed zone and decreasing the reaction efficiency. Accordingly, the invention provides a support structure ("distributor") to minimize this detrimental crushing effect.

Figure 1:
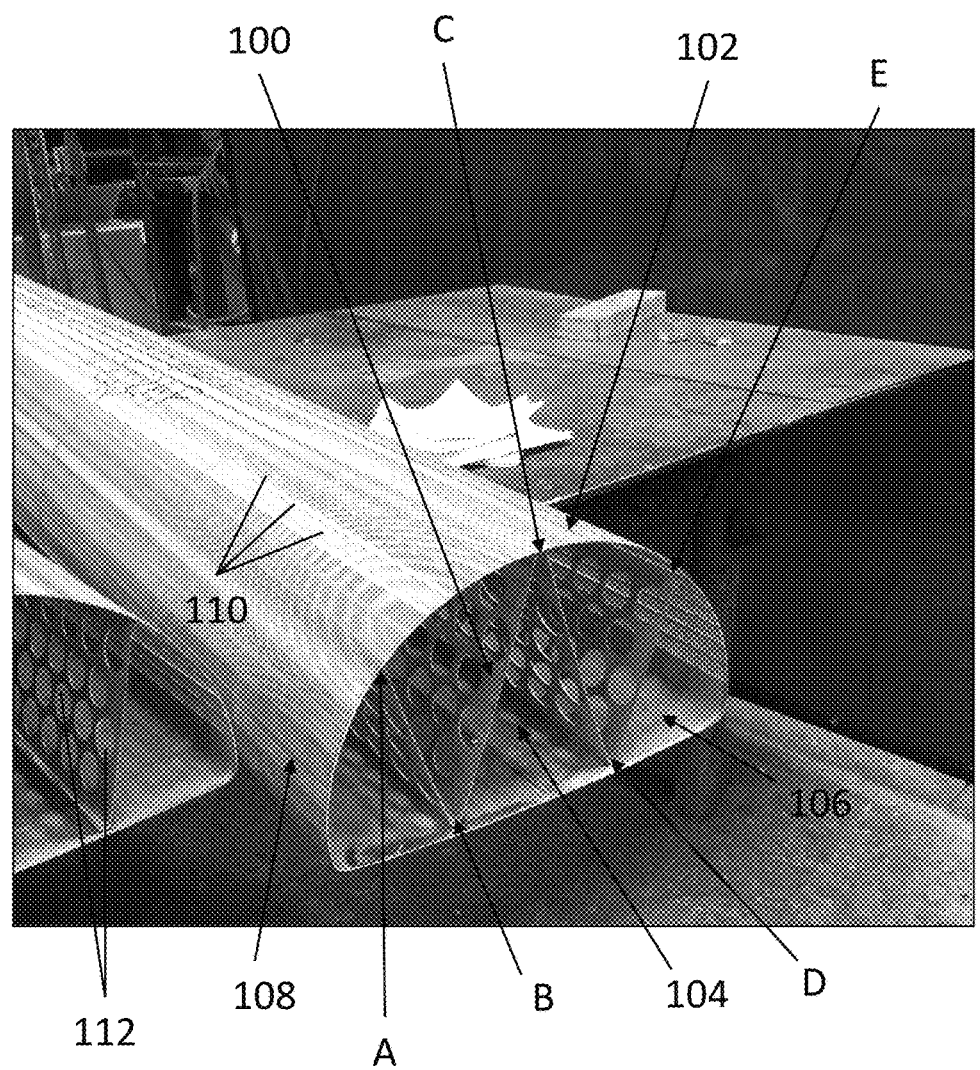
FIG. 1 is a perspective view of a scallop having a support distributor positioned therein in accordance with an embodiment of the invention.

As illustrated in FIG. 1, the invention is directed to a scallop support distributor 100 (hereinafter, the "support distributor 100") that provides physical and mechanical support to the scallop 102. In a preferred embodiment, the scallop 102 has a generally "D"-shaped cross section along its entire length, forming an interior 104. However, the scallop 102 may have any cross-sectional shape known to one skilled in the art and useful for a particular application, including triangular or trapezoidal. The scallop 102 may have any size suitable for use in a particular application in a specific type of reactor vessel. In one embodiment, the scallop 102 may be about 1-25 meters long and have an overall width of about 10 cm-1 m. The size of the scallop 102 is not particularly limited, as it dictates the volume of G-V-L that can be passed through depending on the particular application. In use, as described more fully below, the back side of the scallop 102 is placed adjacent to the vessel wall, such that the distribution side of the scallop 102 (the rounded and perforated or open side) is exposed to the interior of the vessel facing the center pipe.

The scallop 102 has an inner surface 106 and an outer surface 108, such that the inner surface 106 is adjacent to the interior 104. The scallop 102 preferably includes a plurality of openings 110 along its engineered, useable length that extend through the entire thickness of the scallop 102, from the inner surface 106 to the outer surface 108, as illustrated partially in FIG. 1. The openings 110 may each have a generally circular, square or rectangular shape, or any shape known to one skilled in the art may be used as desired for a particular reactor application. As discussed above, when G-V-L flow through the interior 104 of the scallop 102, it flows through the openings 110, where it enters the interior of the reaction vessel. There, the G-V-L is exposed to a catalyst bed adjacent to the scallop 102 and a reaction takes place.

The scallop 102 may be formed of any material known to one skilled in the art, including, but not limited to, metals, ceramics, composites, and the like. In a preferred embodiment, the scallop 102 is formed of metal, preferably a metallic alloy, which is strong enough to withstand the elevated temperatures and G-V-L flow rates inside the reactor vessel without deforming. For example, the scallop 102 may be formed of stainless steel. The material used to form the scallop 102 is not particularly limited, as long as it has sufficient strength to withstand the operating conditions of the reactor. In one embodiment, although not required, the scallop 102 may be provided with a coating or surface treatment, such as an anti-corrosion coating.

As illustrated in FIG. 1, the support distributor 100 of the invention is positioned within the interior 104 of the scallop 102 and makes contact with the inner surface 106 thereof. When in use, the support distributor 100 provides physical and mechanical support to the scallop 102 in the locations where it makes contact with the inner surface 106, labeled as A-E on FIG. 1. Here, the support distributor 100 has a "W"-shaped cross section, and each point on the "W" functions to support and strengthen the scallop 102. Thus, support distributor 100 provides a total of five (5) support points A-E. In other embodiments, the support 100 may have varying shapes and design such that more or less support points are provided. For example, the support distributor 100 may have a generally circular or ovular cross-sectional shape such that two (2) support points are provided (not shown). In another embodiment, support distributor 100 may have a triangular or "V" cross-sectional shape, such that three (3) support points are provided (not shown). In yet another embodiment, the support distributor 100 may have a square cross-sectional shape, such that four (4) support points are provided (not shown). The shape of the support distributor 100 is not particularly limited, as long as it provides a sufficient number of support points to support the scallop 102. In a preferred embodiment, the support distributor 100 has at least five (5) support points and the "W"-shaped cross section illustrated in FIG. 1.

Figure 2:
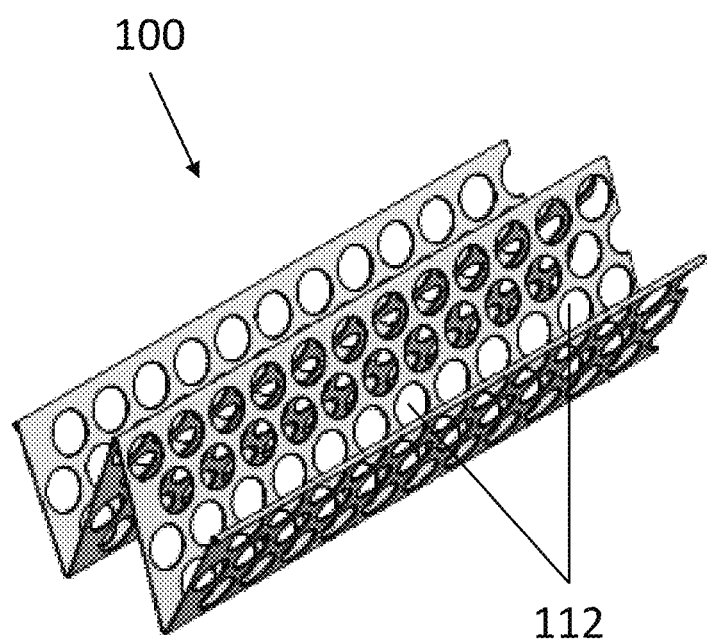
FIG. 2 is a top, perspective view of a support distributor in accordance with an embodiment of the invention.

As illustrated in FIG. 2, the support distributor 100 is preferably formed from a sheet of metal having a plurality of perforations 112. In an alternative embodiment, the support distributor 100 may be formed from a sheet of metal having no perforations 112 such that it has a solid, continuous surface. The metal may be formed into the desired shape (e.g., "W"-shaped) using a variety of metalworking methods, such as, for example, perforating, machining, welding, or deforming (i.e., bending). The perforations 112 allow G-V-L to flow freely through the scallop 102 to optimize the efficiency of the chemical reaction. In FIG. 1, the perforations 112 have a generally circular shape, although any shape may be used that maximizes or enhances the G-V-L flow through the support distributor 100 when it is positioned in the interior 104 of the scallop 102, including square or rectangular. In a preferred embodiment, each of the plurality of perforations 112 are positioned so as to increase support and maximize the volume of G-V-L that may pass through it. Indeed, the support distributor 100 should be designed to minimize disruption to the flow of G-V-L through the scallop 102, while also inexpensively making the scallop 102 stronger and better able to withstand the reactor conditions.

The support distributor 100 may have any size suitable for use in a particular application in a specific type of reactor vessel. The thickness, length, width, and height of the support distributor 100 are not particularly limited and may be selected based upon the parameters of the reactor vessel and the design of the scallop 102. In a preferred embodiment, the support distributor 100 has the same length as the scallop 102, such as, for example, about 1-25 meters long. The width and height of the support distributor 100 are selected such that the support distributor 100 fits within the interior 104 of the scallop 102 snugly. The size of the support distributor 100 is not particularly limited, as it is dictated by the size of the scallop 102 and the volume of G-V-L that can be passed through depending on the particular application.

The support distributor 100 may be formed of any material known to one skilled in the art, including, but not limited to, metals, ceramics, composites, and the like. In a preferred embodiment, the support distributor 100 is formed of the same material as the scallop 102. In one embodiment, the support distributor 100 is preferably formed of metal, such a metallic alloy, which is strong enough to withstand the elevated temperatures, pressures and G-V-L flow rates inside the reactor vessel without deforming. For example, the support distributor 100 may be formed of stainless steel. The material used to form the support distributor 100 is not particularly limited, as long as it has sufficient strength to withstand the operating conditions of the reactor. In one embodiment, although not required, the support distributor 100 may be provided with a coating, such as an anti-corrosion coating or surface treatment.

The support distributor 100 may be attached to the inner surface 106 of the scallop 102 by any means known in the art including, but not limited to, welding, rivets, temporary attachment means such as screws or bolts, and other permanent or temporary attachment mechanisms.

Figure 3:
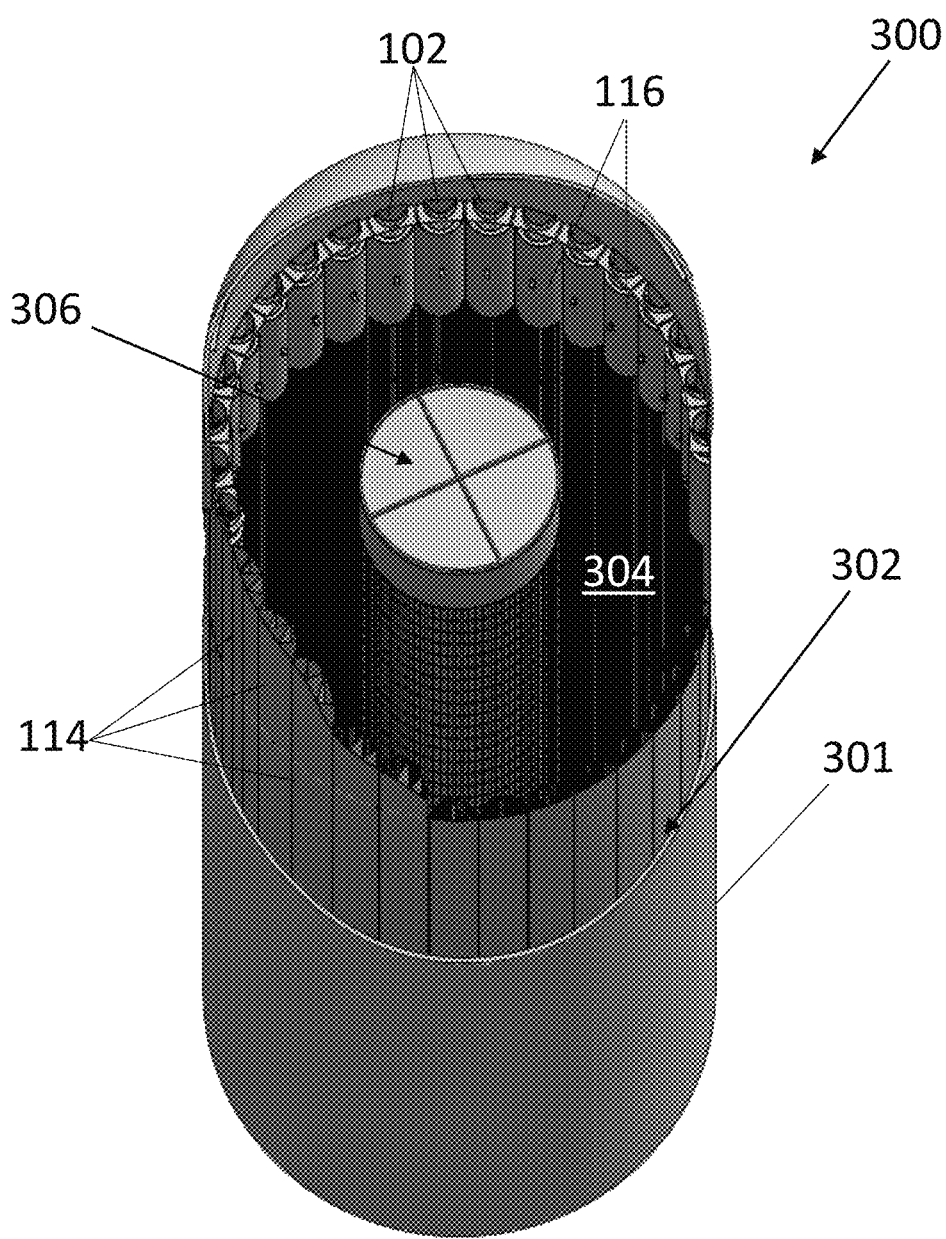
FIG. 3 is a cutaway, cross-sectional view of the inside of a reactor vessel having a plurality of scallops with support distributors in accordance with an embodiment of the invention.

A cross-sectional view of the inside of a reactor vessel 300 is illustrated in FIG. 3. The outermost surface of the reactor vessel 300 is an outer shell 301. Within the reactor vessel 300, a plurality of scallops 102 are arranged circumferentially around an inner wall 302 of the vessel 300. As illustrated, the back surface 114 of the scallops 102 are positioned directly adjacent to the inner wall 302, while the distribution surface 116 of the scallops 102 is exposed to the interior of the vessel 300. The scallops 102 are preferably held in place along the inner wall 302 of the vessel 300 by expander rings (not shown), although any known method of securing scallops within a reaction vessel may be used.

Directly adjacent to the distribution surface 116 of each of the scallops 102 is at least one catalyst bed 304. The catalyst bed(s) 304 contains a catalyst, such as platinum. The reactor catalyst bed(s) 304 may be arranged individually or in a stacked design. If they are arranged individually, they are connected end-to-end in sequence inside of the reaction vessel 300 adjacent to the scallops 102. If they are arranged in a stacked manner, there are typically 3-4 catalyst beds 304 stacked on top of one another and placed adjacent to the scallops 102. In either arrangement, the catalyst beds 304 are fluidized, radial, static, or dynamic reactor beds, such that the G-V-L is always moving.

At the center of the reaction vessel 300 is the center outflow pipe 306. When the feedstock (e.g., G-V-L), such as naphtha or ammonia, flows down into the scallops 102 and escapes through the openings 110, it comes into contact with the catalyst bed(s) 304, thus causing a reaction to take place. The feedstock then flows into the center outflow pipe 306 and out of the reaction vessel 300. The movement of the feedstock into and out of the vessel 300 at different rates can cause variances in pressure within the vessel 300. In use, the feedstock should flow through the scallops 102 into the catalyst bed and then through the center pipe 306.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended claims.

What is claimed is:

1. A support distributor for a scallop for use in a radial flow reactor, comprising an elongated sheet having:
    (a) a plurality of perforations extending through a thickness thereof, and
    (b) at least three edges along a length thereof so as to form a member having at least three support points which engage an inner surface of the scallop.

2. The support distributor of claim 1, wherein the support distributor has a "V"-shaped cross section or a triangular cross-sectional shape.

3. The support distributor of claim 1, wherein the elongated sheet has four edges along a length thereof so as to form a member having four support points which engage the inner surface of the scallop.

4. The support distributor of claim 3, wherein the support distributor has a square or rectangular cross-sectional shape.

5. The support distributor of claim 1, wherein the elongated sheet has five edges along a length thereof so as to form a member having five support points which engage the inner surface of the scallop.

6. The support distributor of claim 1, wherein the support distributor has a "W"-shaped cross section.

7. The support distributor of claim 1, wherein the plurality of perforations have a generally circular, square or rectangular shape.

8. The support distributor of claim 1, Wherein the elongated sheet is formed of a metal alloy.

9. The support distributor of claim 8, wherein the metal alloy is stainless steel.

10. The support distributor of claim 1, wherein the plurality of perforations function to allow gases, vapors and/or liquids to flow through the thickness of the elongated sheet.

11. A supported scallop for use in a radial flow reactor, comprising:
    an elongated conduit having an inner surface and an outer surface forming an interior, and a plurality of openings extending from the inner surface to the outer surface;
    a support distributor positioned within the interior of the elongated conduit, the support distributor comprising,
        a plurality of perforations extending through a thickness thereof, and
        at least three edges along a length thereof so as to form a member having at least three support points which engage the inner surface of the scallop.

12. The supported scallop of claim 11, wherein the elongated conduit has a back side and a rounded, distribution side such that it forms a "D"-shaped cross section.

13. The supported scallop of claim 12, wherein the back side of the elongated conduit engages an inner wall of a reaction vessel.

14. The supported scallop of claim 12, wherein the rounded, distribution side is exposed to an interior of a reaction vessel adjacent to a catalyst bed.

15. The supported scallop of claim 11, wherein the elongated conduit has a triangular or trapezoidal cross-sectional shape.

16. The supported scallop of claim 11, wherein the plurality of openings have a generally circular, square or rectangular shape.

17. The supported scallop of claim 11, wherein the elongated conduit is formed of a metal alloy.

18. The supported scallop of claim 17, wherein the metal alloy is stainless steel.

19. The supported scallop of claim 11, wherein feedstock flows radially through the scallop and support distributor and through the plurality of openings in the elongated conduit of the scallop to come into contact with a catalyst bed in order to effect a reaction.

20. The supported scallop of claim 11, wherein the support distributor is coupled to the interior of the elongated conduit by welding, riveting, screws, or bolts.

* * * * *